United States Patent [19]
Mester et al.

[11] Patent Number: 4,905,099
[45] Date of Patent: Feb. 27, 1990

[54] INTERMEDIATE PICTURE FIELD STORAGE SYSTEM FOR VARIABLE SPEED MAGNETIC TAPE VIDEO DATA READ-OUT

[75] Inventors: Roland Mester, Darmstadt; Jürgen Heitmann, Alsbach-Hähnlein; Rolf Loos, Müster; Jürgen Müller, Griesheim, all of Fed. Rep. of Germany

[73] Assignee: Robert Bosch GmbH, Stuttgart, Fed. Rep. of Germany

[21] Appl. No.: 201,484

[22] Filed: Jun. 1, 1988

[30] Foreign Application Priority Data

Jun. 11, 1987 [DE] Fed. Rep. of Germany ....... 3719496

[51] Int. Cl.⁴ .............................................. H04N 5/91
[52] U.S. Cl. .................................. 360/10.1; 360/10.3; 358/320
[58] Field of Search ..................... 360/10.1, 10.3, 37.1, 360/36.2; 358/319, 310, 312, 138, 320

[56] References Cited

U.S. PATENT DOCUMENTS

| | | | |
|---|---|---|---|
| 4,451,857 | 5/1984 | Mikado | 358/312 |
| 4,558,377 | 12/1985 | Collins | 360/36.2 |
| 4,577,237 | 3/1986 | Collins | 360/10.3 |
| 4,614,979 | 9/1986 | Sugiyama et al. | 360/37.1 |
| 4,731,659 | 3/1988 | Kani | 358/312 |
| 4,733,312 | 3/1988 | Molimoto | 360/10.1 |
| 4,761,694 | 8/1988 | Shudoet et al. | 358/312 |

OTHER PUBLICATIONS

"Standard for Recording Digital Television Signals on Magnetic Tape in Cassettes"-Tech. 3252-E-European Broadcasting Union-Sep. 1986.

Primary Examiner—Robert L. Richardson
Assistant Examiner—W. Daniel Swayze
Attorney, Agent, or Firm—Frishauf, Holtz, Goodman & Woodward

[57] ABSTRACT

Four picture field memories which contain storage places for luminance data, chrominance data, error flags and write flags are switchable from write in to read out by changeover switches controlled by an access control unit for connection of the address and control inputs of the memories either to a write in control circuit or a read out control circuit. The access control unit can be set for operation at normal speed, which is the recording speed of the tape from which signals are read out, below normal speed or above normal speed. The read-out control circuit is synchronized by a synchronizing signal that contains a vertical scan frequency reference pulse. The several picture field memories are cyclically interchanged, written into and read out from. One of the picture field memories is read out while the others are available for write-in. The incoming error flags are passed on. Use is made of write flags and error flags to improve operation at speeds different from the recording speed.

9 Claims, 1 Drawing Sheet

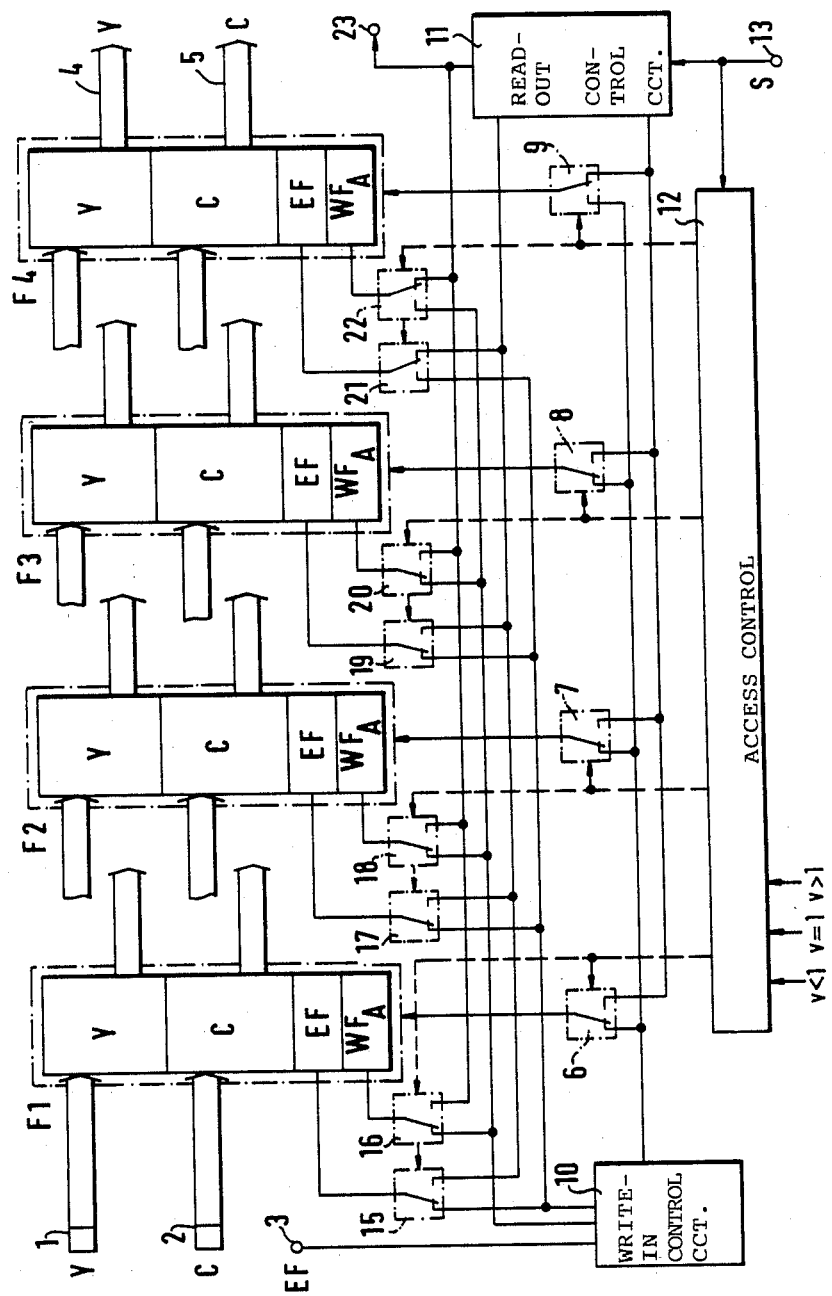

INTERMEDIATE PICTURE FIELD STORAGE SYSTEM FOR VARIABLE SPEED MAGNETIC TAPE VIDEO DATA READ-OUT

This invention concerns video data storage systems for variable speed equipment for reading out from a magnetic tape video data recorded with sector subdivisions in several channels. The recording is done on oblique tracks on the tape by several magnetic heads on a common head wheel.

In one known method of magnetic recording of digitally coded television signals, the analog values are sampled, quantized and coded with addition of identification designations and additional signals for detecting and correcting errors. The data thus put together are then transmitted and recorded in blocks of serial data. On account of the overall large transmission capacity that is necessary in the known magnetic tape devices for recording and/or reproduction of digitally coded television signals recording is done in four parallel channels with correspondingly smaller transmission bandwidth.

In recording and reproduction four magnetic heads are disposed at equal distances around the circumference of a head wheel. 258° of the circumference of the head wheel is enveloped by the tape as it advances in a spiral path in contact with the head wheel. Thus the several heads trace oblique tracks across the tape. The four magnetic heads pass one after the other in contact with the tape along these oblique tracks, each of which contains two track sections which are called sectors containing video data which are separated in the region of the lengthwise midline of the tape by several short track sections which contain various sound information. Each of the sector track sections contains video data which is different that contained in the others of the several (typically four) sectors.

In reproduction of the recorded data precautions must assure that each of the four magnetic heads reads out the data which was recorded by the same or an identical magnetic head of another equipment of the same design. The special arrangement of the track sections with the video data on the magnetic tape makes necessary the switching of the magnetic heads, before and after the data sectors, from one video data channel to another particular video data channel. In recording this takes place according to a fixed scheme that repeats with every revolution of the head wheel. Details of this operation are described in the publication "Standard For Recording Digital Television Signals on Magnetic Tape in Cassettes" of the European Broadcasting Union, Tech-3252-E and in the periodical Fernsehund Kino Technik 1987, Heft ½, pages 15–22.

In reproduction measures are necessary to assure that the video data distributed over the four channels is correctly put back together again. For this purpose in accordance with the copending patent application assigned to the Assignee of this application, claiming the priority of German Patent Application P 37 18 567.5, a crosspoint switch is used having outputs at which data belonging to the respective sectors are separately available and are written into a temporary memory for each sector. In that system the temporary memories, which have also been called intermediate storage units, perform various functions. In the first place there is a "deshuffling" of the signals read out from the tape by corresponding control of write in and read-out. That is because the digital video signals were shuffled before recording in order to have possible disturbances, that would otherwise be concentrated in a particular region of the picture, distributed over a greater portion of the picture and therefore appear to be less disturbing and be more easily concealed. Another function of the intermediate storage is the elimination of timing errors. For this purpose the signals coming from the crosspoint switch are written into the intermediate storage with timing that is still affected by the mechanical imprecisions of the magnetic tape machine, and are read-out of the intermediate storage at a precise and steady rate which in a studio would be synchronized to studio clock pulses.

A third function performed by the temporary memories relates to stop frame reproduction, slow motion and accelerated motion reproduction. In stop frame reproduction the last picture written into the temporary memory is continuously repeated. In slow and fast motion reproduction the magnetic heads do not follow the tracks recorded at the normal speed, but pass over the tracks at an acute angle, so that a period of readable signals is followed by a period of disturbed signals which are produced by scanning of the space between the tracks or scanning of two neighboring tracks at the same time. There is a known way of "collecting" the usable signals in the temporary memory and thereafter reading them out in synchronism with the steady clock pulses required for the picture reproduction.

SUMMARY OF THE INVENTION

It is an object of the present invention to provide a video data intermediate storage system for variable speed equipment for reading out from a magnetic tape which will perform the functions above-described in an efficient way and which will particularly make possible reading out video data signals from a magnetic tape at a tape speed that is only a little slower than the speed at which the recording was made on the tape. It is a further object of the invention to provide a system of that kind which can compensate for timing errors having an increased time variation range.

In accordance with further development of the invention error and write flags can advantegously be stored in the same picture field memories as the video data under the same addresses. That has the advantage that in operation at slow tape speeds the overwriting of error free signals already in a memory by erroneous new signals can be prevented. Furthermore, the persistence of error free data from previous picture fields among partly erroneous data of a later picture field can also be prevented.

BRIEF DESCRIPTION OF THE DRAWING

The invention is further described by way of illustrative example by reference to the annexed drawing, in which the single FIGURE is a block circuit diagram of a video data intermediate storage system according to the invention comprising four (4) picture field memories.

DESCRIPTION OF THE ILLUSTRATED EMBODIMENT

In the intermediate storage system for video data shown in the drawing the luminance information Y and the chrominance information C are supplied, in each case as 8-bit words, at the respective inputs 1 and 2. In parallel thereto error flag signals EF are supplied to the input 3 which are produced in a preceding error correction circuit not shown in the drawing when an uncorrectable error is present in the video data. A suitable error correction circuit for this purpose is described in a copending application, claiming the priority of German Patent Application P 37 19 404.6.

In the annexed drawing four picture field memories F1 to F4 are provided, each of which is composed of four sector memories. The subdivision into sector memories is not of significance for the present invention, as will be recognized by those familiar with the above-mentioned standard for recording digital television signals on magnetic tape and cassettes. For that reason each picture field memory is represented simply as a single memory, the only subdivisions shown being of those relating to other matters which are of concern for the present invention.

The video data are supplied from the inputs 1 and 2 to the inputs of the picture field memories F1, F2, F3 and F4. Each of these picture field memories has outputs respectively for the luminance data and the chrominance data. The outputs of the picture field memories are combined to form an output 4 for the luminance information and an output 5 for the chrominance information.

An error flag EF and a write flag WF may also be stored under the address of any luminance or chrominance sample value. When these flags are set or erased will be explained further below.

Each of the picture field memories F1 to F4 has an address and control input A which will be referred to as a control input. According to the signals supplied to their control inputs, the picture field memories F1 to F4 may be operated either in the write-in mode or in the read-out mode. The control inputs can be switched respectively by the changeover switches 6, 7, 8 and 9 for connection either to a write-in control unit 10 or a read-out control unit 11. The changeover switches 6-9 are controlled by an access control unit 12 to which a synchronizing signal S is furnished as a reference signal at an input 13. The synchronizing signal S contains the reference pulse of the read-out vertical scanning frequency. Signals are supplied to or by other inputs of the access control unit 12 which represent settings for the various kinds of operation, namely reproduction at normal speed (tape speed the same as in recording), at a speed below normal speed and at a speed above normal speed. Two additional changeover switches are provided corresponding to each of the changeover switches 6-9 controlled by the unit 12. These additional switches are the switches 15, 16; 17, 18; 19, 20 and 21, 22.

The picture field memories F1, F2 and F3 are connected for write-in operation of the position of the changeover switches shown in the drawing. The write-in control circuit 10 accordingly generates the addresses. The picture field memory F4 is connected for a read-out operation for this position of the changeover switches shown in the drawing. It is then controlled by the read-out control circuit 11.

In the case of reproduction of television pictures at normal tape speed, when therefore the frequency of the vertical scan frequency reference pulses is the same as the picture field frequency of the signals read out from the tape, with every beginning of a picture field after the vertical scan frequency reference pulse a new picture field memory is switched into the read out mode. When that new picture field memory has written into it the signals read out from the tape belonging to a picture field, another memory provided for write-in will be connected for control by the write-in control circuit 10. The fully written in picture memory will be switched into the read-out mode at the next vertical scan frequency reference pulse. The tape transport as well as the rotation of the head wheel are so coupled with the synchronizing signal S that, allowing for possible random fluctuations (timing errors), the next following picture field memory is fully written into when the picture field memory in the read out mode is fully read out. The switching over from the write-in mode to the read-out mode therefore takes place during the vertical scan frequency blanking interval of the synchronizing signal S.

The error flags EF supplied along with erroneous video data are also written into memory at the same time as video data. In addition, the addresses into which video data are written in are marked with a write flag WF. In a read-out operation the error flag EF is likewise read out and supplied through the output 23 to other circuits for error correction and error concealment not shown in the drawing. In addition an error flag is set at the output 23 during the read out operation in case the write flag was erased in read out.

At video data reproduction speeds which are smaller than the recording speed a picture field memory has video data written into it more slowly while a local or studio-synchronous rhythm necessary for the picture field memory which is in a read out operation. Provision is therefore made to read out two or more picture fields from the picture field memory in the read out mode, with the benefit of an interpolation device, known in itself, for every second read out for obtaining every other picture field from the same stored picture field. For a corresponding length of time the picture field memory, for example, F1, remains available for write in.

In the case of picture reproduction speeds which are smaller than the recording speed a greater angle is found between the scanning tracks and the length dimension of the tape than between the recorded tracks than the longitudinal edge of the tape. In a transition from one of the recorded picture fields to the next, therefore, it may occur that the magnetic head during a part of its contact with the tape scans the beginning of a new picture field and during another part of its contact with the tape the end of a previously recorded picture field. For this case a correct sorting of the signals by means of the write in control circuit 10 is carried out for the first mentioned and the next picture field memories.

In reproduction speeds which are smaller than the tape recording speed it is necessary that four picture field memories be provided in accordance with the invention.

Before the write in of the video data it is checked whether the related write flag is set in the memory. If the write flag should be erased, that signifies the corresponding memory location is as it was first written in following a read out of that memory. When the write flag is set, the write-in control circuit 10 permits newly supplied data to be written in only when no error flag is set accompanying the data.

The designation of the memory locations with the flags as above-described furthermore has the advantage that it prevents the persistence of the content of previous pictures in the memories when new pictures are supplied. For example if before the beginning of the recording unusable signals are written into the memory, the first signals of the recording are written in in any case even when they are accompanied by error flags, since in the last reading of the memory all write flags were erased. Consequently at picture reproduction speeds in which multiple reading takes place, the write flag is retained for the repeated read-out operations. In an actual embodiment, the erasing of the write flags is now possible only in the sequence of the read out addresses. If memories should be available which make possible the simultaneous erasure of all storage locations, the write flags should be erased after the last read out.

In the case of reproduction speeds which are higher than the recording speed the video data are again read out from the tape with interruptions. In this mode of operation, a picture field memory always remains in the read out mode during two picture fields while another memory is written into for the same period at high reproduction speeds and with movements in the pictures recorded. Picture portions of various movement phases are found in that picture memory which is switched over from write-in to read-out and these picture portions can differ strongly from each other at high reproduction speeds. In order to reduce this it is also possible for switch over of the memories to take place after every picture field. For reducing expense and complication for controlling the memory at reproduction speeds that are greater than the recording speed, in this case preferably only two picture field memories are alternately written into and read out.

Although the invention has been described with reference to the particular embodiment and the particular methods of operation, it will be understood that modifications and variations are possible within the inventive concept.

We claim:

1. Video data intermediate storage system for variable speed equipment for reading out from a magnetic tape video data recorded with sector subdivisions in a plurality of channels, having tape speed control means providing settings for tape speeds respectively slower than, equal to, or greater than the tape speed at which video data was recored on the tape, comprising:

four picture field memories, each including a luminance sample value memory a chrominance sample value memory, a write flag memory and an error flag memory, said write flag memory being for storage of write flag for designating that, at a corresponding address, there is at least a luminance or a chrominance sample value which was not read-out in a previous picture field read-out;

a set of four read/write switching means respectively connected to said picture field memories for connecting each of them selectively either exclusively for video data write-in or exclusively for video data read-out, in accordance with control signals for said respective memories;

means for generating said control signals for said memories in such a way that at any one time only one of said picture field memories is available for readout and so that the number and sequence of said memories made available for write-in is variable, in repsonse to said settings of said tape speed control means, and for allocating the number of said picture field memories available for write-in in response to a said setting of said tape speed control means;

write-in and read-out memory addressing means for addressing in every addressing step a luminance sample value a chrominance sample value, a corresponding error flag address, and a corresponding error flag address, and means for synchronizing switchover of said switching means and for synchronizing read-out from that one of said picture field memories which is being used in read-out therefrom, said synchronizing means including means for generating a reference synchronizing signal containing at least pulses of a read-out vertical scan frequency.

2. Storage system according to claim 1, wherein means are provided for supplying first and second synchonizing pulses respectively at the rates of write-in and read-out of said sample values repectively for and from storage, and means are provided whereby, in repsonse to each of said first and second sample rate synchonizing pulses, video data may be only written in or only read-out, whereas an error flag or a write flag may be read out and also altered during write-in in response to a single one of said second sample rate synchronizing pulses.

3. Storage system according to claim 1, wherein means are provided to prevent writing in video data accompanied by an error flag unless at the corresponding address in the write flag memory portion of the same picture field memory the write flag most recently written therein has been erased, whereas said writing-in prevention means does not interfere with writing in video data free of any associated error flag.

4. Storage system according to claim 1, wherein means are provided to associate an error flag with video data being read out from a said picture field memory in the event the write flag formerly associated therewith in said memory has been erased.

5. Storage system according to claim 1, wherein, for operation with a tape speed equal to the tape speed used in recording, wherein means are provided with every said reference signal vertical scan frequency pulse to switch over a said picture field memory from a write-in mode of operation to a read-out mode of operation.

6. Storage system according to claim 1, wherein for operation with a tape speed that is less than the tape speed used in recording, means are provided and activated whereby a said picture field memory is regularly switched into a read-out operation by the first said reference signal vertical scan frequency pulse that follows the instant at which the data of a picture field recorded on the tape becomes completely written into the said picture field memory, and wherein repeated read-out of a picture field memory takes place while awaiting switching to another memory for read-out.

7. Storage system according to claim 1, wherein, for operation with a tape speed that is greater than the tape speed used in recording, means are provided, and activated in response to every second said vertical scan frequency pulse, to switch over one said picture field memory into a read-out operation and to switch over another said picture field memory into a write-in operation.

8. Storage system according to claim 7, wherein for operation with a tape speed that is greater than the tape speed used in recording means are provided, and activated, for alternately writing into and reading out only two said picture field memories.

9. Storage system according to claim 1, wherein means are provided for storing an error flag in a said picture field memory after picture field memory has been read out and a read-out operation of another picture field memory is about to begin.

* * * * *